Dec. 20, 1927.
R. W. HANNA ET AL
1,653,431
DISTILLATION OF PETROLEUM OILS
Filed Oct. 2, 1922
3 Sheets-Sheet 1
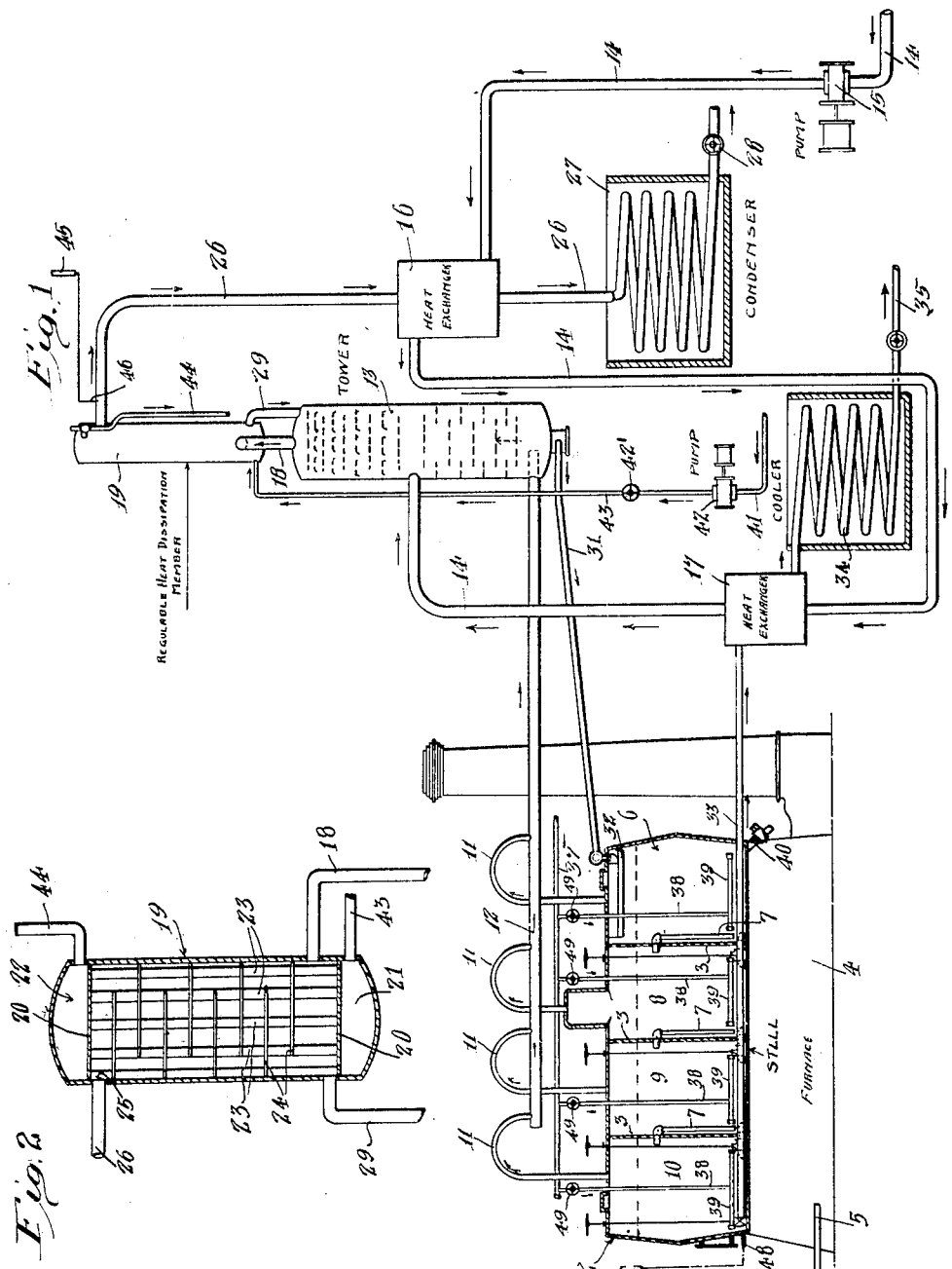
Inventors
Richard J. Hanna
Richard W. Hanna
By Lyon & Lyon, attys

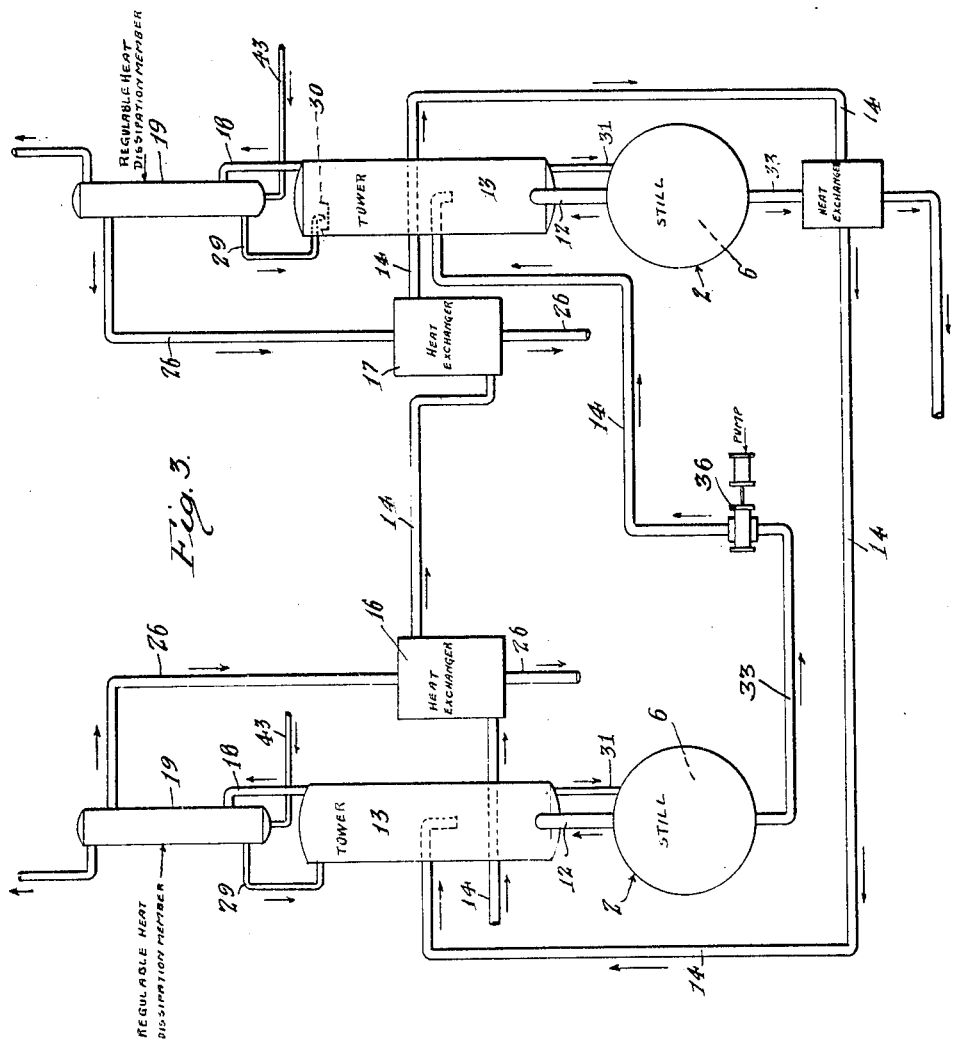

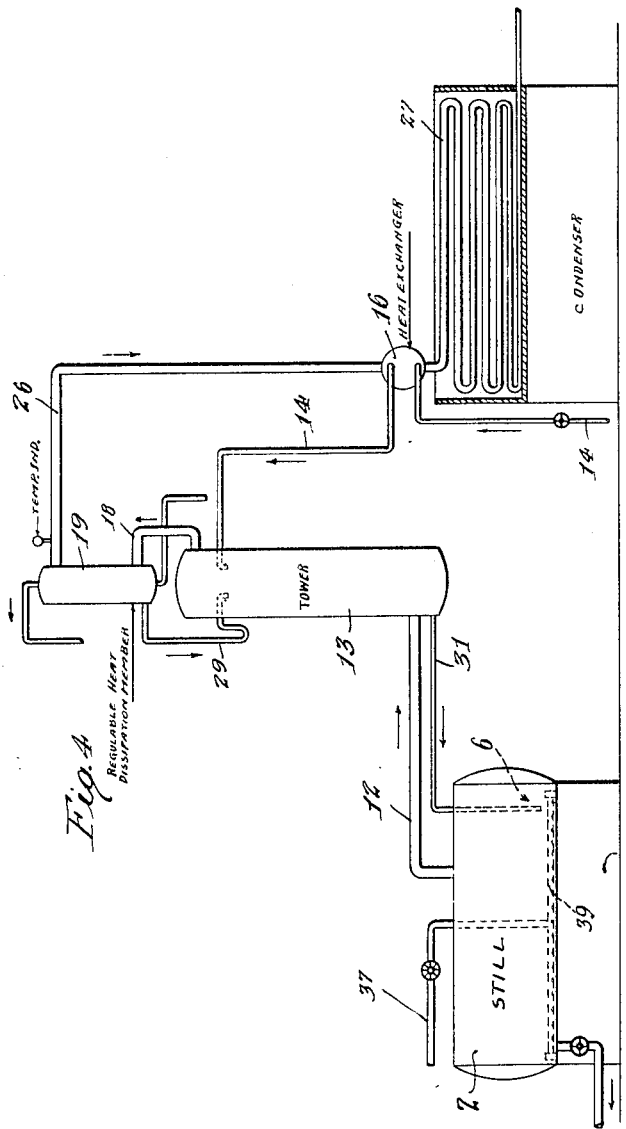

Patented Dec. 20, 1927.

1,653,431

UNITED STATES PATENT OFFICE.

RICHARD W. HANNA, OF PIEDMONT, AND RICHARD J. HANNA, OF BURLINGAME, CALIFORNIA, ASSIGNORS, BY MESNE ASSIGNMENTS, TO STANDARD OIL COMPANY OF CALIFORNIA, OF SAN FRANCISCO, CALIFORNIA, A CORPORATION OF DELAWARE.

DISTILLATION OF PETROLEUM OILS.

Application filed October 2, 1922. Serial No. 591,773.

This invention relates primarily to the art of distilling crude petroleum, although certain aspects of the invention may be effectively utilized in connection with destructive distillation thereof, commonly known as "cracking", and in other aspects the invention may be applied in re-distillation of distillates produced by other distillations.

In one of its aspects this invention comprehends the process and apparatus for the continuous production, from crude petroleum, of distillates having the desired boiling point ranges so that re-distillation will not be required.

In another aspect this invention comprehends the continuous production from crude petroleum of distillates having the desired boiling point ranges so that not only will redistillation be unnecessary but the desired products will be obtained, one from each distilling unit, in such a way that mixing or blending will be unnecessary, and at the same time a maximum practical yield of the desired distillate will be obtained.

In another aspect this invention comprehends the continuous production of any desired number of distillates of various boiling point ranges by using a number, corresponding to such desired number of distillates, of distilling units properly operatively connected together.

It is understood that various attempts have been made to produce distillates from crude petroleum which will require no re-distillation. Some of these have been by fractional distillation and some by fractional condensation, wherein the refluxes from fractional condenser or from various points in a fractionating column are diverted as the desired products. However, so far as is known, no equipment or process has been developed which has made it possible to produce from a single still a single distillate with the boiling point range such that neither re-distillation nor blending with other distillates would be necessary.

In order to accomplish these results it has been found that first of all it was necessary to develop a means for the accurate and positive control of the heat dissipation from the vapors evolved in the distilling unit so that by this control the necessary reflux can be obtained and the desired distillate produced. It has further been found that to produce the desired distillate the temperatures of the vapors to be condensed must be accurately controlled and this regardless of disturbing influences within the system, such as the rate of firing, still temperature, or changes in the character of or rate of feeding the crude.

It has been further found that not only is it necessary to have the distillate vapor temperatures within the control of the operators, but for efficient operation it is necessary to make use of a tower wherein the evolved vapors may be thoroughly scrubbed by descending reflux oils before entering the temperature control chamber.

Briefly a preferred embodiment of the invention in a process and apparatus may be described as follows:

The crude oil is fed into a tower connected to a still; in connection with the tower is a heat dissipation (or distillate temperature control) member, suitable condensing equipment and desired heat exchanger. The evolved vapors pass from the still to the tower where they are contacted with the incoming feed and the descending reflux and where the desired scrubbing takes place, the feed and reflux running to the still and the contacted vapors passing to the reflux control member, where the heat dissipated, (and thus the reflux,) is so controlled that only vapor existing at a determined temperature remains. The residue distillate vapors then are emitted from this control chamber at the determined temperature and pass on to be condensed as distillates requiring no further distilling. When it is desired to produce more than one cut from the crude petroleum, the residuum from the first still is carried to a second distilling unit and a second cut produced. This process may be repeated for any desired number of cuts.

While this invention is most valuable in the production of finished boiling point distillates directly from crude petroleum it is readily understood that because of the nature of the process and equipment any petroleum oil containing the desired fractions can be successfully fractioned by use of this invention and the use of the invention for the production of desired distillates from any petroleum oils is comprehended. We have successfully run, in addition to crude petroleum, crude pressure naptha, and crude naptha from other stills.

This invention may be more readily understood in connection with a description of a preferred process embodying the invention as practiced in a given apparatus. Reference is therefore had to the accompanying drawings by which a preferred embodiment of our invention may be more readily understood.

In the drawings:

Figure 1 is a side elevation partially in section of a single unit.

Fig. 2 is a longitudinal sectional view of the regulable heat dissipation member.

Fig. 3 is a diagrammatic view illustrating two units coupled in series.

Fig. 4 is a side elevation of another form of apparatus.

In Fig. 1 of the drawings 2 indicates a still which is preferably divided into a series of compartments by vertical partitions 3. In the drawings these partitions 3 are indicated as welded to the inner surface of the still 2, so as to form non-communicating compartments in the still. The still 2 is indicated as mounted over a suitable furnace 4 heated by the combustion of fuel from a suitable burner 5. From the inlet compartment 6 a pipe 7 extends upward from near the bottom of the compartment and thence through the partition 3 opening into the adjoining compartment 8. Communication between the other adjacent compartments is by means of similar pipes 7. 11 indicates vapor lines leading from the respective compartments and discharging into a common vapor line or header 12. In the apparatus thus illustrated, the withdrawal of evolved vapors from the respective compartments is independent of the other compartments. The vapor line or header 12 preferably inclines slightly downward toward and enters into the tower 13 slightly above the bottom. The tower 13 may be of any ordinary or any preferred construction of vapor tower. In the drawing, in dotted lines, the tower is indicated as provided with baffle plates arranged in staggered relation so as to cause the ascending vapors to flow in a contorted path. 14 indicates a suitable line from a source of supply, such for instance as a storage tank (not shown). 15 indicates a pump by which the oil to be distilled is pumped through the line 14 passing through the vapor heat exchanger 16 and thence through a residual oil or tar heat exchanger 17 and thence into the tower 13 intermediate its ends. Preferably the incoming oil is delivered by the feed pipe 14 onto one of the baffle plates. 18 indicates a vapor line from the top of the tower 13 entering the regulable heat dissipation member 19 preferably a short distance above the bottom thereof and at the side of and communicating with the vapor chamber thereof. Referring to Fig. 2, this member 19 is shown as preferably cylindrical in form and provided with closed ends and with tube sheets or partitions 20 which provide two chambers 21 and 22 at the bottom and top respectively of the member 19. 23 indicates tubes extending through tube sheets 20 and through the chamber of the member 19 so that communication from the chamber 21 to the chamber 22 is through these tubes 23. In the vapor chamber of the member 19 (between the tube-sheets 20) deflection plates 24 are provided so that vapors entering the chamber from the vapor line 18 are caused to circulate back and forth through the chamber in passing upward therethrough, thus contacting repeatedly with the surfaces of the tubes 23, finally passing out through the vapor outlet 25 into the line 26 which in turn passes through the vapor heat exchanger 16, and thence through a continuation of the line 26 through the condenser 27, and from thence to suitable storage. 28 indicates a valve upon this condensate line. This valve, in the use of the form of apparatus shown in Fig. 1, is normally open. 29 indicates a conduit for the drawing off of the condensate from the member 19 and discharging such condensate into the tower 13 at the top thereof, where it is showered onto and into the uprising vapors. As indicated in Fig. 3 this line 29 enters into a pan 30 which forms a seal or trap of condensate, preventing the uprising vapors entering the reflux line 29. It is obvious that any practical liquid trap, such for instance as shown in Fig. 4, may be used. It is to be noted that the vapor line 18 enters the member 19 above the level of the reflux draw off line 29. 31 indicates a line from the tower 13 to the first compartment of the still 2 whereby the reflux and incoming feed preferably passes onto a suitable distributing pan 32 of the ordinary or any preferred construction.

33 indicates a residual oil or tar draw off. If the invention is performed in an apparatus consisting simply of one still 2 and producing only one distillate, then this draw off line 33 communicates with the compartment 10, or hottest part of the still 2, and carries the residual oil to the heat exchanger 17 and to and through the cooler 34; from this the cooled residual oil or tar is passed by the line 35 to suitable storage. When, however, the apparatus is in the form of a series of inter-communicating stills 2, (as indicated in Fig. 3,) then the line 33 is connected by means of a suitable pump 36 to the feed line 14 of the next still. The withdrawal of residual oil or tar from the last still of a series or battery would preferably be that indicated in Fig. 1, while Fig. 3 indicates the arrangement of the withdrawal of residual oil from one still and its feed into a subsequent still of the battery.

37 indicates a steam line leading from a suitable supply. From this line 37 lines 38 provided with suitable valves 49 lead to nearly the bottom of the still where the steam is discharged into the respective compartments of the still through perforated horizontal pipes 39.

40 indicates a draw off from the still 2—there may be provided a similar draw off from each compartment if desired. 41 indicates a water line leading from any suitable source of supply and connected through the pump 42, valve 42' and line 43 to the chamber 21 of the member 19. 44 indicates a steam line leading from the chamber 22 for discharging the steam evolved in the member 19. It is obvious that if desired chamber 22 may be connected with the line 37 by means of suitable regulating devices. 45 indicates a temperature indicating device, suitably connected with a temperature measuring device 46 in the vapor line 26. 47 indicates a suitable temperature indicating device connected with a suitable temperature measuring device 48 in the compartment 10 of the still 2. If desired there may be similar indicating and measuring devices for each of the compartments.

In Fig. 4 the still 2 is indicated as an ordinary steam still provided with a steam supply line 37 connected with a distributing pipe 39. This still may or may not be mounted over a suitable furnace as desired. As shown in Fig. 4 the feed line 14 passes through vapor heat exchanger 16 and thence into the tower 13 intermediate its end. 12 indicates the vapor line from the still 2 to the tower 13 and 31 the reflux line from the bottom of the tower 13 to the inlet end of the still 2. The vapor line 18 from the tower 13, regulable heat-dissipating member 19, reflux line 29 from the member 19 to the tower 13, vapor line 26 from the member 19 to the heat exchanger 16 to a suitable condenser 27 all correspond with similar devices of Fig. 1. In Fig. 4 the reflux line 29 is shown with a trap formed by the low bend of the line providing a liquid seal against vapors of the tower 13 passing upward through this line 29.

In order to counteract any changes in temperature conditions due to changes of weather, and retain the heat dissipation within the regulable control of the operator, all of the apparatus from the still 2 to the entrance of the condenser 27 is suitably insulated to prevent the dissipation of heat. This insulation is not specifically indicated in the drawings. It, however, may consist of asbestos sheets and plaster properly applied, or of any other suitable or preferred heat insulation.

Preferably water or other liquid is fed to the chamber 21 of the heat dissipating member 19 at such a rate as to compensate for evaporation losses and to maintain such a level in the member 19 that the correct amount of effective cooling surface will be in contact with vapors so as to bring about the desired temperature of the distillate vapors. The fractions condensed from the vapors because of the resultant reduction of temperature are those not desired in the final product and are returned to the tower as reflux. This regulation may be accomplished by varying the flow of cooling medium to such chamber by any suitable means such as the valve control indicated in the drawings. The temperature indicating devices make possible the observation of the distillate vapor temperature. With this method of control a constant pressure is preferably maintained on the cooling medium within such member by opening directly to the atmosphere or by means of valves or other suitable devices. Where water is used as the cooling medium, more or less violent evaporation of the same takes place because of the high vapor temperatures. In case other cooling medium be furnished to the chamber 21, such for instance as an oil of such characteristics that little evaporation takes place under the imposed conditions of pressure and temperature, the quantity of such cooling medium admitted and the quantity withdrawn is suitably controlled by valves or other usual means so as to maintain just sufficient cooling medium within the member 19 to effect the desired heat dissipation.

It is recognized that by correct design of the member 19, it is possible to effect the correct dissipation of heat by flowing a liquid through the entire cooling surface of said member and vary the cooling effect or dissipation of heat by varying the rate or temperature of the cooling medium passing therethrough.

The condensate from the member 19 passes down to the tower wherein it is scrubbed against up-coming vapors. It should be noted that in this part of the tower the up-coming vapors are in contact only with a condensate of said vapors and thereby a thorough sifting of the lighter fractions from the heavier is obtained. At a point lower in the tower the feed line enters and the feed to the distilling unit is introduced against the up-coming vapors. In this portion of the tower a rough scrubbing of the up-coming vapors occurs in which the vapors, reflux, and feed oil are brought to substantially the same temperature. It will thus be seen that by bringing the feed stock to be distilled into the vapor tower at a point intermediate its ends, and bringing the reflux from the heat dissipation member into the vapor tower at its top, there is provided a three stage separation or condensation. By this means a much more thorough sifting of the heavier or higher boiling point fractions from the evolved vapors is attained than has heretofore been possible without re-distillation.

It has also been found that by the use of the controllable heat dissipation of the evolved vapors, as well as by this three stage refluxing, a higher percentage of those fractions with boiling points within the desired range is obtained than by any hitherto known method. This advantage of increasing the yield of the first distillate also has a marked beneficial effect upon the subsequent distillate where a plurality of stills are operated together as indicated in Fig. 3, and when the second distillate is desired to have what is commonly known as a relatively high flash point. This advantage inures to each succeeding distillate made where series distillation is carried out through a plurality of distilling units by passing the residual oil from one distilling unit to another and operating all such units in accordance with this embodiment of the invention. This advantage is probably due to the shortening of the overlap of the end points of the respective distillates.

By the proper control of the feed of cooling medium to the chamber 21 of the member 19, the effective condensing surface of the member 19 may be varied as required in the operation. This enables the operator to control the temperature of the discharged vapors so that such temperature may be so maintained as to produce a distillate of the desired boiling point range, even where the rate of distillation varies or where other factors effecting the evolution of vapors from the distilling operation occur.

By thus providing regulable control of the heat dissipation, the operator can control the boiling point range or gravity of the distillate produced substantially independent of the increase or decrease of the heat supplied to the oil for distillation and may suitably control such output independent of the rate of distillation.

We claim:

1. A process of distilling petroleum oil, which consists in continuously distilling an oil, continually passing the evolved vapors to a vapor tower, continuously passing the evolved vapors from said tower to a heat dissipating member and there bringing the vapors to a desired discharge temperature by dissipation of heat from the vapors to a liquid cooling medium the temperature of which is controlled without varying the character of the feed to the tower, continuously condensing as one product the vapor passing from said heat dissipating member, continuously returning the condensate from such dissipating member to said tower, continuously supplying the oil to be distilled to a medial point in said tower, and continuously passing such oil, together with the condensate from such tower, into the distilling zone, said process being characterized by the separation of no intermediate product.

2. The process of distilling petroleum oil comprising continuously distilling an oil, continuously passing the evolved vapors through a three-stage vapor separating system, in the first stage of which the evolved vapors are scrubbed by the feed oil to the system, together with a condensate from the other stages, in the second stage are scrubbed against the condensate from the third stage, and in the third stage are brought to a desired discharge temperature by controllably dissipating the heat thereof to a separately regulated cooling medium the temperature of which is controlled without varying the character of the feed oil, condensing as one product the vapors from said third stage, and passing the condensate from such vapor separating system together with the feed oil to the source of evolved vapors, said process being characterized by the separation of no intermediate product.

3. The process of continuously distilling petroleum oil, which comprises continuously vaporizing an oil, continuously passing the vapor through a three stage vapor separating system, in the first stage of which the vapors are scrubbbed against the feed oil to the system together with the condensate from the other stages, in the second stage of which the vapors are altered only by the scrubbing action of the condensate from the third stage, and in the third stage the vapors are brought to a desired discharge temperature by controllably dissipating the heat thereof to a separately regulated liquid cooling medium the temperature of which is controlled without varying the character of the feed oil, condensing as one product the vapors from such third stage, and passing the condensate from said vapor separating system together with the feed oil to the source of the evolved vapors, said process being characterized by the separation of no intermediate product.

4. A process of distilling petroleum oil comprising continuously vaporizing an oil, continuously passing the evolved vapors through a vapor separating system wherein the vapors are progressively subjected to first the scrubbing action of the condensate from the other stages of the system and the feed oil to the system, and are last brought to the desired discharge temperature by dissipation of heat from such vapors to an independently regulated cooling medium the temperature of which is controlled without varying the character of the feed oil, the feed oil together with the condensate from said system being continuously passed to the source of the vapors, and continuously condensing as one product the vapors from said vapor separating system, the cooling medium being maintained continuously in the boiling condition, said process being characterized by the separation of no intermediate product.

5. A process of continuously distilling a petroleum oil comprising continuously vaporizing the oil, continuously passing the evolved vapors through a three stage vapor separating system, in the first stage of which the vapors are subjected to the condensing action of the feed oil to the system and the condensate from the other stages, in the second stage of which the vapors are subjected only to the condensing action of the condensate from the third stage, and in the third stage the vapors are brought to a desired discharge temperature by controllably dissipating heat thereof to a separate liquid cooling medium the temperature of which is controlled without varying the character of the feed oil maintained at its boiling point, the feed oil together with the condensate from such vapor separating system being passed to the source of evolved vapors, and condensing as one product the vapors from such vapor separating system, said process being characterized by the separation of no intermediate product.

Signed at Richmond, Calif., this 22nd day of September, 1922.

RICHARD W. HANNA.
RICHARD J. HANNA.